US008800749B2

(12) United States Patent
Marbacher

(10) Patent No.: US 8,800,749 B2
(45) Date of Patent: Aug. 12, 2014

(54) APPARATUS FOR PROCESSING FLAT ARTICLES, IN PARTICULAR PRINT PRODUCTS

(75) Inventor: Beat Marbacher, Nebikon (CH)

(73) Assignee: Mueller Martini Holding AG, Hergiswil (CH)

( * ) Notice: Subject to any disclaimer, the term of this patent is extended or adjusted under 35 U.S.C. 154(b) by 1845 days.

(21) Appl. No.: 11/272,294

(22) Filed: Nov. 14, 2005

(65) Prior Publication Data

US 2006/0102449 A1 May 18, 2006

(30) Foreign Application Priority Data

Nov. 12, 2004 (EP) .................................... 04405697

(51) Int. Cl.
*B65G 47/26* (2006.01)
*B65G 47/61* (2006.01)

(52) U.S. Cl.
USPC ....................... 198/440; 198/377.02; 198/407

(58) Field of Classification Search
USPC .............. 198/348, 367, 374, 377, 387, 418.7, 198/418.8, 440, 456, 458, 377.06, 436, 198/418.6
See application file for complete search history.

(56) References Cited

U.S. PATENT DOCUMENTS

| | | | | |
|---|---|---|---|---|
| 2,920,737 | A * | 1/1960 | Engleson et al. | 198/458 |
| 3,933,236 | A * | 1/1976 | Aterianus et al. | 198/418.6 |
| 4,267,917 | A * | 5/1981 | Vogel | 198/457.03 |
| 4,397,599 | A * | 8/1983 | Sabel | 414/790.3 |
| 5,292,110 | A | 3/1994 | Honegger | |
| 6,786,328 | B2 * | 9/2004 | Honegger | 198/890.1 |
| 6,893,016 | B2 | 5/2005 | Pav et al. | |
| 2001/0045342 | A1 | 11/2001 | Frei | |
| 2002/0105131 | A1 | 8/2002 | Koelle | |
| 2002/0159874 | A1 | 10/2002 | Honegger | |
| 2003/0085503 | A1 | 5/2003 | Eugster | |
| 2004/0124066 | A1 | 7/2004 | Honegger | |

FOREIGN PATENT DOCUMENTS

| | | |
|---|---|---|
| DE | 29 17 250 | 10/1980 |
| EP | 1 431 222 | 6/2004 |
| JP | 5-238626 A | 9/1993 |
| JP | 8-133469 A | 5/1996 |
| JP | 2003-306269 A | 10/2003 |
| WO | WO 96/32293 | 10/1996 |
| WO | WO 2004/033351 | 4/2004 |

OTHER PUBLICATIONS

Office Notice dated Jun. 14, 2011 in Japanese Patent Application No. 2005-327407.

* cited by examiner

*Primary Examiner* — Kavel Singh
(74) *Attorney, Agent, or Firm* — Venable LLP; Robert Kinberg; Tamatane J. Aga

(57) ABSTRACT

An apparatus for processing flat articles, comprises a first conveyor adapted to convey the flat articles in a product flow, and a separator adapted to divide the product flow into at least two partial flows. The separator comprises a plurality of containers arranged in a row. The containers are adapted to accommodate flat articles. The containers move substantially transverse to the product flow and substantially parallel to the product flow to form the partial flows.

18 Claims, 5 Drawing Sheets

APPARATUS FOR PROCESSING FLAT ARTICLES, IN PARTICULAR PRINT PRODUCTS

CROSS-REFERENCE TO RELATED APPLICATION

This application claims the priority of European Patent Application No. 04405697.6-2304, filed on Nov. 12, 2004, the entire content of which is incorporated herein by reference.

BACKGROUND OF THE INVENTION

The present invention relates to an apparatus for processing flat articles, in particular, print products. The apparatus comprises a first conveying agent for conveying the flat articles in a product flow, as well as separating means for dividing the product flow into at least two partial flows.

In the print processing industry, flat articles of this type are produced in particular by gathering and collating signatures (e.g., one or more sheets ready to be encased) in a gathering and wire-stitching machine. The gathered signatures are then processed further, for example, by trimming them in a trimming apparatus and subsequently laminating them. The processing speed of the gathering and wire-stitching machine generally exceeds that of the trimming apparatus and the laminating machine. It is known from International Publication No. WO 96/32293 to divide the product flow into two partial flows to increase the capacity. This is designed to allow the time-parallel processing of two spatially separated partial flows of print products along two parallel-extending processing sections. The print products are conveyed with a conveying chain along a conveying loop section to form the partial flows. Arranged along the conveying chain are grippers which respectively grip the individual print products. After processing, the partial flows are recombined.

German Patent Application No. DE 29 17 250 A discloses an apparatus in which an overlapping flow of print products is divided into two partial flows. Two rows of grippers circulating continuously along endless paths are assigned to the edges of the overlapping flow. With this type of apparatus, the print products in the overlapping flow to be divided must be offset to the side, such that they can be gripped by the grippers.

Dividing an overlapping flow into two partial flows with the aid of grippers is also known from European Patent Application No. EP 1 431 222 A. With the disclosed apparatus, the grippers do not grip the individual print products along the edge, but rather, grip them in a central region where the individual print products are not overlapped by adjacent print products.

The respective print products in the aforementioned partial flows no longer overlap, but rather, are conveyed one behind the other. The print products in the partial flows can then be processed in a different apparatus, for example, in a trimming apparatus or a laminating machine. By dividing the product flow into two partial flows, the processing time for the print products in the partial flows can at least be doubled. A higher-quality processing is furthermore possible since more time is consequently available for the processing. As an alternative to dividing the product flow into partial flows, it is also possible to arrange the print products in intermediate buffer storage areas. In this case, the print products are arranged in an overlapping flow on rollers. Intermediate buffer storage areas of this type make it possible, for example, to operate printing machines at maximum capacity. A comparatively high expenditure is required, however, to form such intermediate buffer storage areas, as well as to arrange print products at these intermediate storage areas.

SUMMARY OF THE INVENTION

It is an object of the present invention to provide an apparatus that permits a secure and simple division of a product flow into partial flows.

According to one exemplary embodiment, the present invention provides an apparatus for processing flat articles, comprising: a first conveyor adapted to convey the flat articles in a product flow; and a separator adapted to divide the product flow into at least two partial flows, the separator comprising a plurality of containers arranged in a row, the containers adapted to accommodate flat articles; wherein the containers move substantially transverse to the product flow and substantially parallel to the product flow to form the partial flows.

The apparatus of the present invention can eliminate the need to grip the flat articles with a gripper to form the partial flows. Instead, the articles can be deposited in containers that move transverse to the conveying direction, and simultaneously, in the conveying direction, to form the partial flows. A very reliable handling of the flat articles is thus possible, as well as a secure and precise guidance of the flat articles in the area where the flow is divided.

According to one exemplary embodiment of the invention, the containers can be repositioned in the dividing area from a slanted or perpendicular position relative to the horizontal line to a substantially horizontal position. The flat articles can thus be transferred in the horizontal position, for example, onto takeover belts. The horizontal positioning provides the advantage that the flat articles can always be spaced apart with the same timing, regardless of the product format, which simplifies further processing, for example, the laminating operation.

A further advantage of the apparatus according to the present invention is that additional flat articles (e.g., inserts), can easily be added to the containers in the area where the flow is divided.

According to another exemplary embodiment of the present invention, the individual flat articles can be dropped from the first conveying agent downward and into the slanted and/or vertically arranged containers. The flat articles can thus drop as a result of the gravitational force into the containers. According to yet another exemplary embodiment, the containers can comprise pockets that are open on the top. The flat articles can be conveyed securely and precisely aligned inside the pockets.

According to another exemplary embodiment of the invention, the individual containers can be positioned on a guide element that permits displacement for the movement transverse to the conveying direction. These guide elements can be guide rods. The containers located on the guide rods can be positioned crosswise, and in particular, can be repositioned from a slanted and/or perpendicular position to a substantially horizontal position. The repositioning can be realized, for example, with the aid of control cams. Movement of the containers to the side can also be realized with the aid of control cams.

According to yet another exemplary embodiment of the invention, the containers can be arranged on an endless conveying agent. The conveying agent can be a link chain. The chain can be fitted around a drive wheel and/or a reversing wheel.

According to another exemplary embodiment of the invention, the containers can be arranged circumferentially around a wheel, such that the containers can be moved in the conveying direction as well as transverse to the conveying direction. The wheel can comprise a pocket wheel. The containers can be loaded at approximately the 12 o'clock position, and unloaded at approximately the 3 o'clock position. This permits a division of the product flow within a comparatively short conveying region. With a wheel of this type, it can also be possible to recombine two partial flows into a single flow.

According to another exemplary embodiment of the invention, an additional, or third, conveying agent can be provided, which takes over the partial flows, for example, using takeover belts. The additional conveying agent can operate with a similar, or slower, speed than the speed in the area where the flow is divided. This can provide the advantage of allowing a variable adjustment for the product spacing. Consequently, the product spacing can be optimized for the further processing requirements.

The flat articles can be print products, such as brochures, magazines, newspapers, and the like. The print products can be laminated during the time that the flow is divided, although alternative and/or additional types of processing are possible as well. The print products can be produced in a gathering and wire-stitching machine, although other methods for producing the print products are also possible.

The apparatus according to the invention can also be used for combining two partial flows to form a single product flow. Therefore, another exemplary embodiment of the invention provides an apparatus for combining two partial flows.

BRIEF DESCRIPTION OF THE DRAWINGS

These and other features and advantages of the invention will be further understood from the following detailed description of the preferred embodiments, with reference to the accompanying drawings, to which reference is made for all details not expressly mentioned in the text.

DETAILED DESCRIPTION OF THE INVENTION

Figure 1:
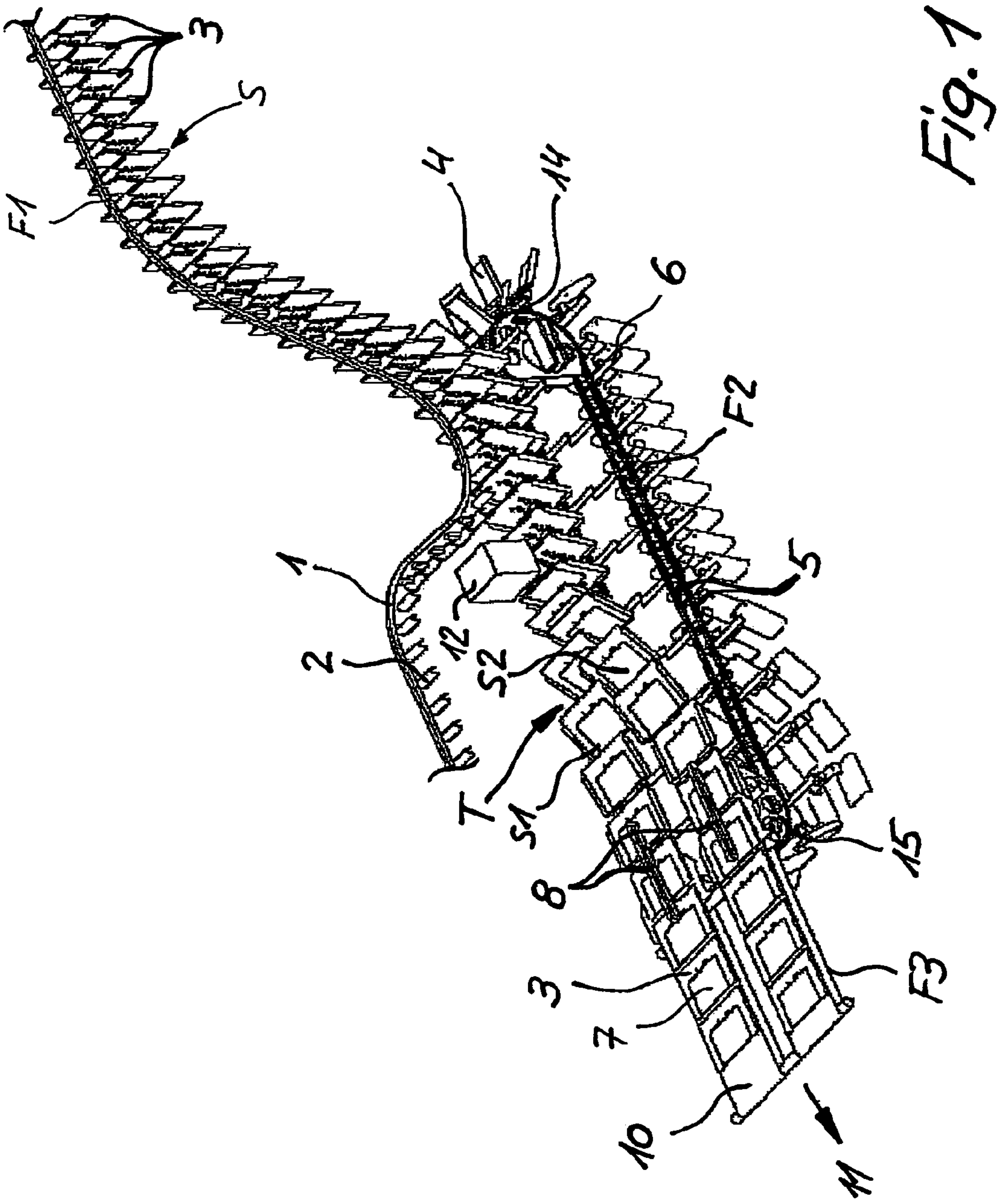
FIG. 1 is a perspective view of an apparatus according to an exemplary embodiment of the invention.

Referring to FIG. 1, an apparatus according to an exemplary embodiment of the invention comprises a first conveying agent F1 including a conveying chain 1, such as a link chain, having uniformly spaced-apart gripping means 2 arranged thereon. The gripping means 2 can comprise clamping elements, clamps, or the like. The gripping means 2 can each grip a print product 3 along one edge. The print products 3 shown in FIG. 1 form a flow S, illustrated as being conveyed from the right to the left. As can be seen, the products 3 are conveyed while suspended. However, alternative methods of conveying these products are possible, for example, on a conveyor belt or the like. The products 3 are withdrawn, for example, from a gathering and wire-stitching machine (not shown) by means of the first conveying agent F1.

The products on the first conveying agent F1 can be released to a separating means T that functions to divide the product flow S into two partial flows S1 and S2. The separating means T includes a plurality of containers 4 that are arranged on a second conveying agent F2. The containers 4 can comprise open-topped pockets that are dimensioned and configured to accommodate one print product 3 each.

The containers 4 are each positioned on a guide element 6 attached to an endless conveying agent, such as a conveying chain 5. The guide elements 6 can comprise guide rods. The individual containers 4 can be displaced transverse to the conveying direction along the guide elements 6. The containers 4 can be attached to the guide elements 6 by hinges 13 (shown in FIG. 2), allowing the containers 4 to swivel.

Figure 3:
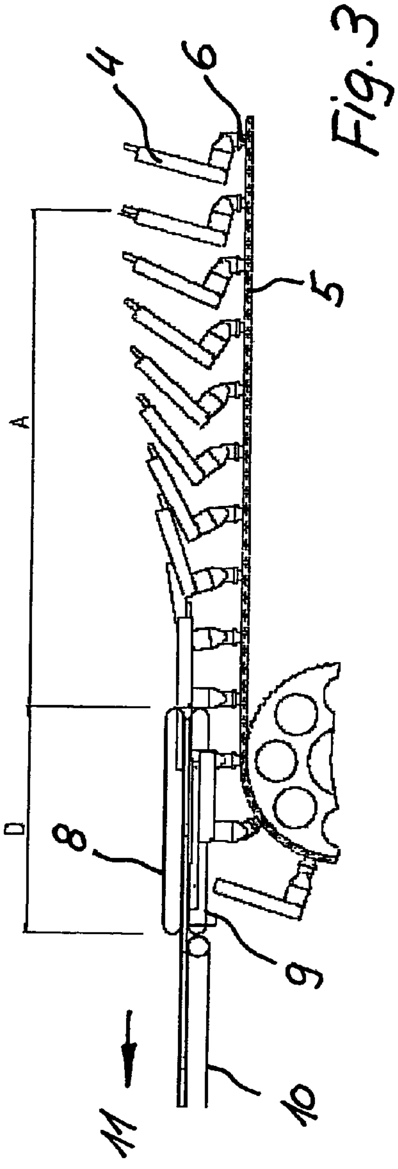
FIG. 3 is another partial side view of the apparatus of FIG. 1.
Figure 4:
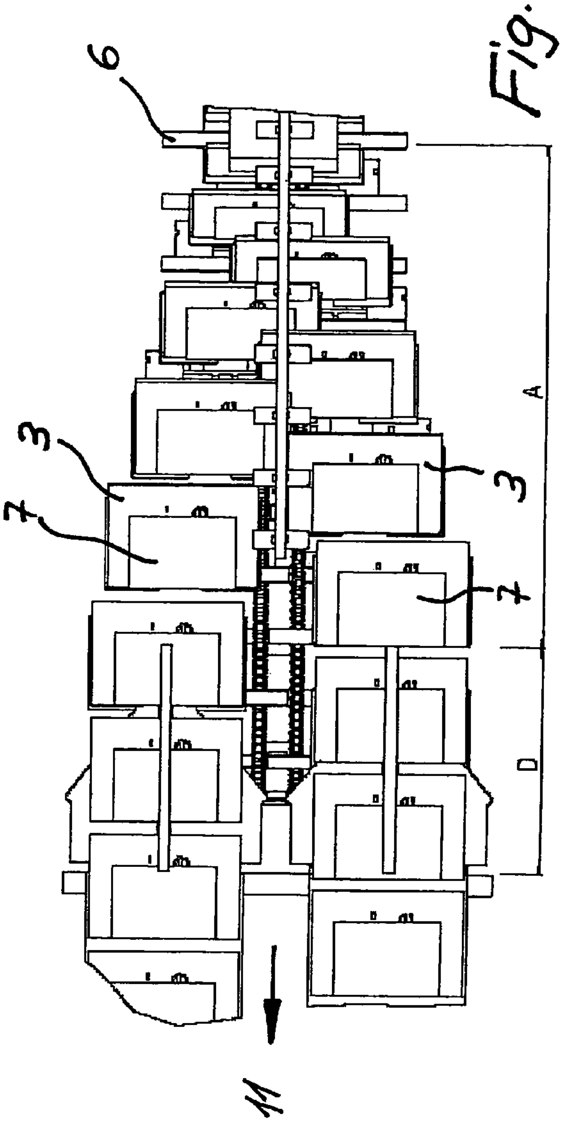
FIG. 4 is a partial top view of the apparatus of FIG. 1.

FIG. 3 illustrates the swiveling ability of the containers 4. In an upper conveying section of the conveying chain 5, the containers 4 are swiveled in a clockwise direction, for example, with the aid of a cam (not shown). The containers 4, which are initially oriented substantially vertically, can be swiveled in a region A from this slanted or substantially vertical position to a substantially horizontal position. The containers 4 move forward in the conveying direction simultaneously with swiveling around the axis 13. FIG. 4 shows the sideways displacement of containers 4. The containers 4 can be displaced alternately to the left and/or to the right, substantially transverse to the conveying direction. In the process, the containers 4 are divided into the aforementioned partial flows S1 and S2.

Figure 2:
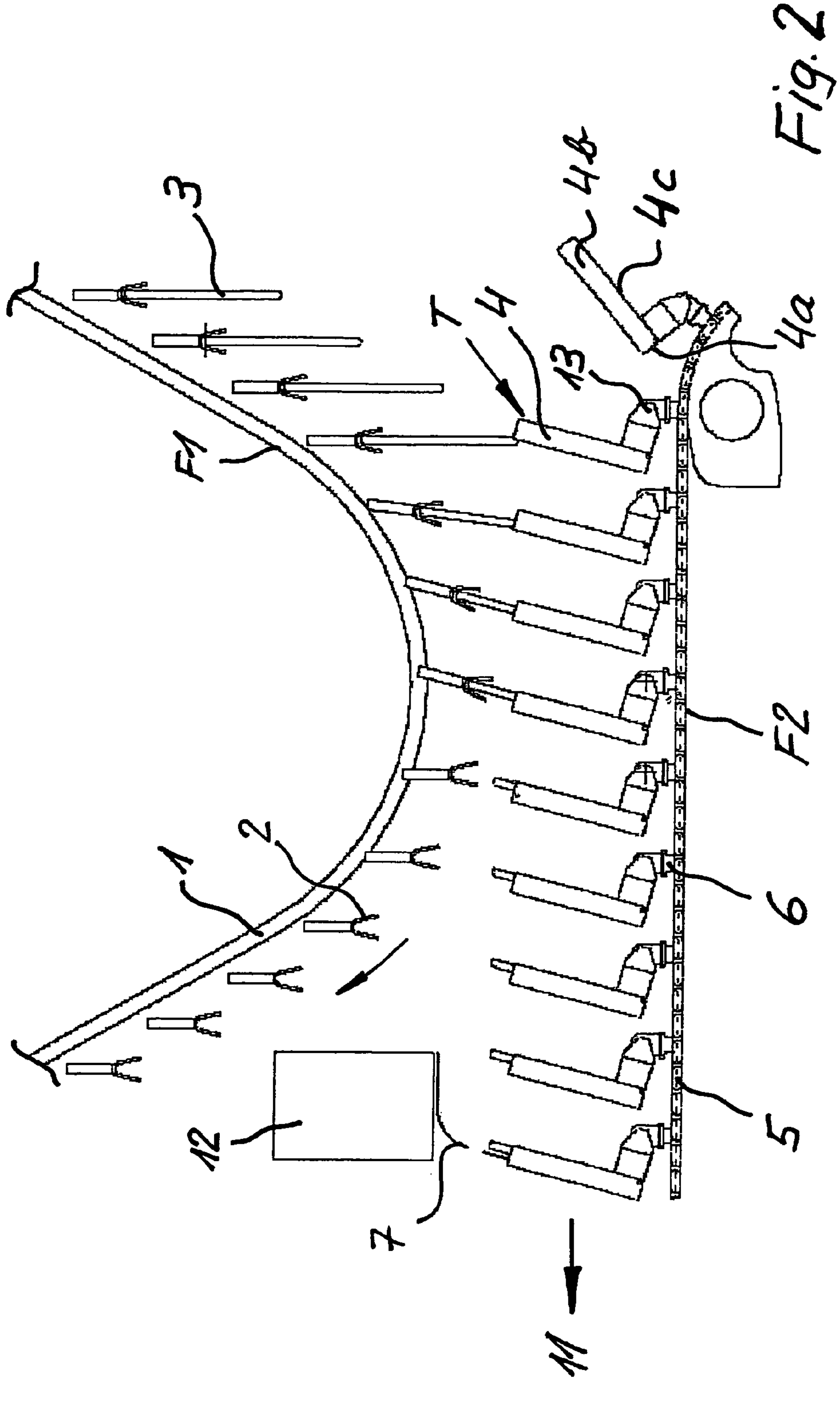
FIG. 2 is a partial side view of the apparatus of FIG. 1.

A separate print product 3 is deposited into each of the containers 4 before they are divided into the partial flows S1 and S2. FIG. 2, in particular, illustrates the operation of depositing the print products 3 into the containers 4. FIG. 2 furthermore shows that the print products 3, suspended from a first conveying agent F1, approach the containers 4 by moving from the top toward the bottom. The print products 3 in this case are suspended from above, and are each gripped along the upper edge by a gripping means 2. Once a print product 3 is positioned above a container 4, the gripping means 2 opens and the respective print product 3 drops (as a result of gravity) into a container 4.

Each of the containers 4 respectively comprises a bottom 4*a*, two side walls 4*b*, and one rear wall 4*c*. The bottom 4*a*, the side walls 4*b*, and the rear wall 4*c* keep the respective print product 3 inside the container 4 which, as previously mentioned, can be shaped like a pocket or similar to a pocket. To facilitate receiving the products 3, the pockets 4 can be slightly tilted back, as shown in FIG. 2. Generally, each container 4 holds one product 3, however, according to alternative embodiments, each container 4 can hold multiple products 3. Inserts 7 can also be deposited into the containers. The inserts 7 can be ejected, for example, from an insert magazine 12. As shown in FIG. 2, the open gripping means 2 move upward and away from the separating means T.

Referring to FIG. 3, the filled containers 4 swivel in a clockwise direction to assume a substantially horizontal position. The swiveling angle is preferably smaller than 90°, but a swiveling angle of 90° is in principle also possible. The products 3 together with the containers 4 are thus repositioned horizontally.

As shown in FIG. 3, a transfer region D is created once the containers 4 have assumed a substantially horizontal position. In this region D, the products 3 are taken over by another, or third conveying agent F3, shown in FIG. 1, which conveys the products 3 in the direction of arrow 11. This conveying agent F3 can comprise two parallel upper takeover belts 8 and two lower takeover belts 9 (see FIG. 3) that are also parallel. The products 3 in the takeover region D are arranged separately and one behind the other. The third conveying agent F3 can move at the same or a lower speed than the second conveying agent F2. The product spacing in the region of the third conveying agent F3 can be varied by adjusting the conveying speed of the third conveying agent F3. The product spacing in the region of the third conveying agent F3 can be maintained at a constant within the partial flows, regardless of the dimensions of the products 3, which is advantageous for further processing operations (e.g., laminating).

As shown in FIG. 1, once the second conveying agent F2 has transferred the products 3 to the third conveying agent F3, the empty containers 4 which are suspended from the lower conveying section are moved downward in the region of the drive wheel 15 and arrive at the deflection wheel 14 where they are again moved to the region of the upper conveying section. The print products 3 are conveyed on the third conveying agent F3, for example, on conveying belts 10, and are supplied to a processing apparatus (not shown), for example, a laminating machine or a trimmer. In the region of the lower conveying section of the conveying chain 5, the containers 4 are displaced sideways, such that they again form a single row and are conveyed one behind the other with uniform spacing. Once the containers 4 are again positioned at the start of the upper conveying section, they are again filled as described above. In the region of the lower conveying section of the conveying chain 5, the partial flows with containers 4 are merged again to form a single flow with the aid of control cams (not shown herein).

Figure 5:
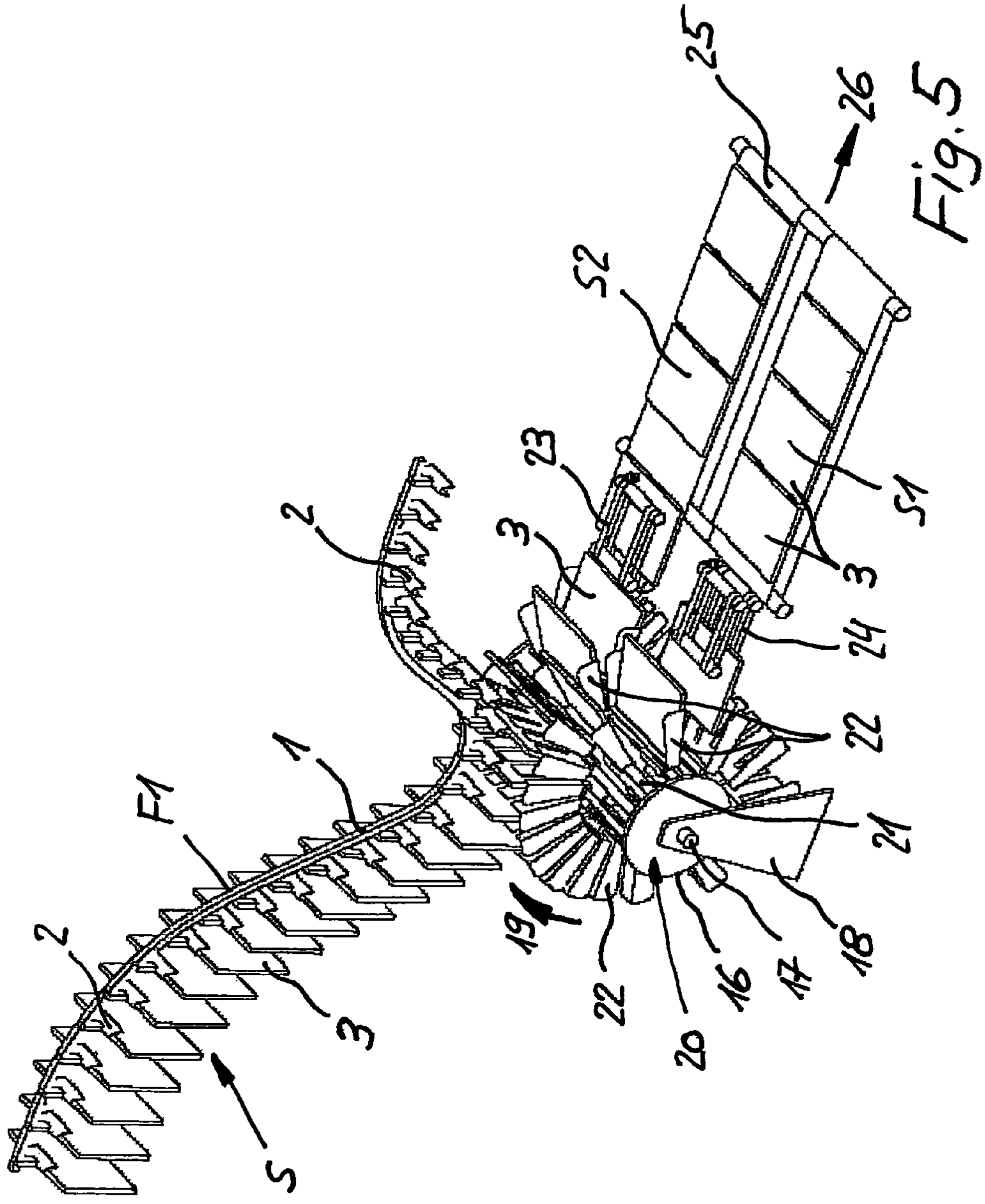
FIG. 5 is a perspective view of an alternative embodiment of the apparatus of FIG. 1.
Figure 6:
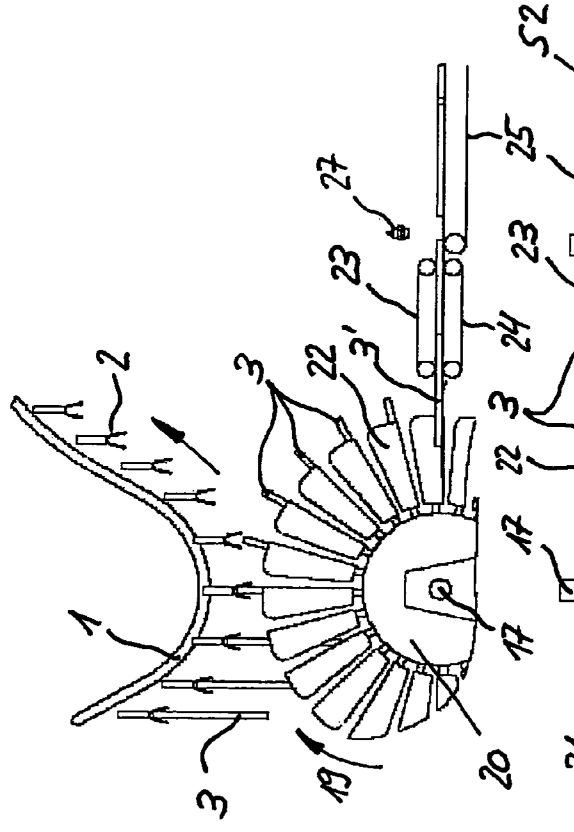
FIG. 6 is a partial side view of the apparatus of FIG. 5.
Figure 7:
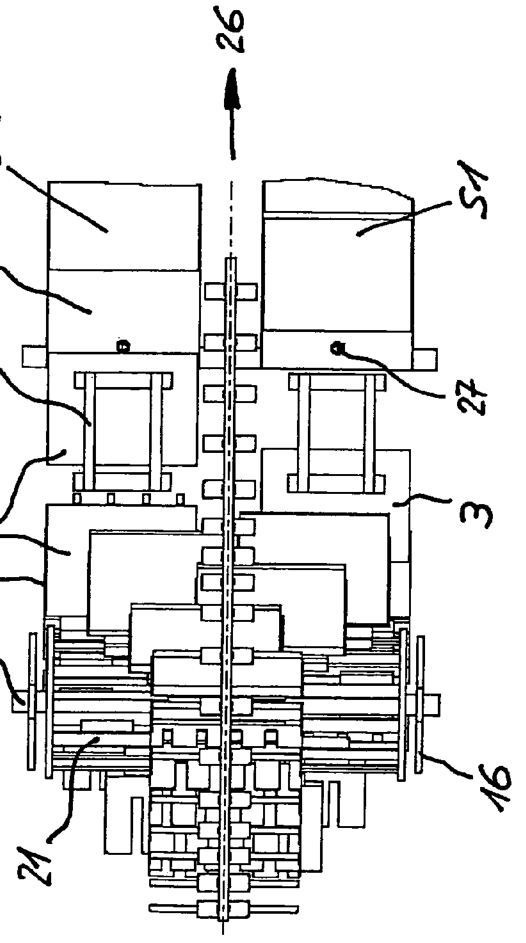
FIG. 7 is a partial top view of the apparatus of FIG. 5.

FIGS. 5 to 7 show an alternative embodiment of an apparatus according to the invention. The first conveying agent F1 for this apparatus can have the same design as the one described above. The products 3 can be transferred to the containers 22 in the manner described above. The containers 22 can be designed in substantially the same way as the above-mentioned containers 4. For example, they can comprise pockets having a bottom, side walls, and a rear wall. As shown in FIG. 5, the containers 22 are positioned on a drum 16 that is mounted on a shaft 17 located on a base 18. The drum 16 is driven by drive means (not shown), around the shaft 17 in the direction of arrow 19. The drum 16 can include a plurality of guide elements 21, preferably rods, that are arranged in parallel and with uniform spacing relative to each other. The drum 16 and containers 22 form a pocket wheel 20 having circumferentially arranged containers 22, that are aligned so as to point radially outward, as shown in particular in FIG. 6. In contrast to the containers 4, the containers 22 can be mounted rigidly, meaning their orientation is advantageously always the same and radial. However, according to alternative embodiments, the containers 22 can swivel.

The containers 22 can be filled as soon as they are positioned upright, for example, in the vertical and/or approximately the 12 o'clock position. The containers 22 move continuously in the clockwise direction for the loading operation. When respective print products 3 are positioned in the region of containers 22, the respective gripping means 2 open up to release the print products 3, such that they drop into the respective containers 22 as a result of gravity. Following the release of the products 3, the gripping means 2 again move away from the pocket wheel 20, as shown in FIG. 5. The filled containers 22 are advanced substantially without interruption, and finally arrive at a horizontal position and/or a substantially 3 o'clock position.

During movement of the containers 22 from the 12 o'clock position to the 3 o'clock position, the containers are displaced transverse to the conveying direction along the guide elements 21, so that two partial flows form. For example, the containers 22 are preferably displaced alternately to the left or to the right, so that they are completely separated, however, other configurations are possible. For example, two containers can be displaced simultaneously to the left or the right. The containers 22 are thus divided into the two partial flows over an angular region of approximately 90°, and the products 3 are consequently divided into the partial flows S1, S2. Once the products 3 are in the horizontal position, they are taken over by an upper conveying belt 23 and a lower conveying belt 24 and are conveyed horizontally.

Referring to FIG. 7, one upper takeover belt 23 and one lower takeover belt 24 (labeled in FIG. 6) can be provided for each partial flow. The conveying speed for these belts 23 and 24 can be adjusted such that the products 3 are pulled from their respective container 22. The product 3' shown in FIG. 6 has already been gripped along a front edge by the takeover belts 23 and 24, while the rear edge is still located inside the container 22. The takeover belts 23, 24 cause the product 3' to move to the right, as represented by the arrow 26 shown in FIGS. 5 and 7. As soon as the next container 22 is located in the horizontal position, the product 3' is completely withdrawn from the pocket wheel 20 and is supplied to a conveying belt 25. As shown in FIG. 7, one conveying belt 25 can be provided for each of the partial flows S1, S2. A sensor 27 can be arranged above the conveying belts 25. The sensor 27 can be used to detect the positions of the products 3, for example, the spacing between adjacent products 3 in the respective partial flows S1, S2. The data obtained from sensor 27 can be used for control purposes, for example, to adjust the spacing between the products 3 in the partial flows S1, S2.

According to an alternative embodiment of the invention, the pocket wheel 20 can be used to recombine two partial flows S1 and S2 into a single flow. This essentially involves reversing the direction of operation. For example, in FIGS. 6 and 7, the partial flows S1 and S2 move from the right to the left (i.e., in the opposite direction of arrow 26). The pocket wheel 20 correspondingly moves counterclockwise (i.e., in the opposite direction of arrow 19). The products 3 can thus be inserted horizontally into the containers 22, and removed therefrom with the aid of the gripping means 2 vertically upward and out of the containers 22. During the changeover from the horizontal to the vertical positioning, the containers 22 can move from an outside to a central position. As a result, the containers 22 are combined into a single flow. The products 3 are consequently combined to form a single flow, in which they can be conveyed by the conveying chain 1. Combining the partial flows S1 and S2 in this way is also possible using the apparatus described above in connection with FIGS. 1 to 4.

The above-mentioned apparatuses are described in connection with dividing a single flow into two partial flows. However, alternative embodiments are possible that can be used to divide a flow into more than two partial flows. For example, three partial flows can also be formed using a first container that is not displaced transverse to the movement direction, a subsequent second container that is displaced to the left, and another subsequent container that is displaced to the right, etc. According to another alternative embodiment, a partial flow can be further divided into two additional partial flows. Conversely, an alternative embodiment of the invention can be used to recombine more than two partial flows to form a single flow.

It will be understood that the above description of the present invention is susceptible to various modifications, changes and adaptations, and the same are intended to be comprehended within the meaning and range of equivalents of the appended claims.

What is claimed is:

1. An apparatus for processing flat articles, comprising:

a first conveyor adapted to convey the flat articles in a direction of a product flow; and a separator adapted to divide the product flow into at least two partial flows, the separator comprising a plurality of containers arranged in a row, each container adapted to receive a flat article from the first conveyor before the product flow is divided into the at least two partial flows, wherein the containers are displaceable substantially transverse to the direction of the product flow to form the partial flows while simultaneously moving substantially parallel to the direction of the product flow.

2. The apparatus of claim 1, wherein the containers are adapted to move from an upright or substantially perpendicular position with respect to a horizontal line to a substantially horizontal position after the receipt of the flat articles into the containers.

3. The apparatus of claim 1, wherein the first conveyor is adapted to suspend the articles during conveying, and to drop the flat articles into the containers.

4. The apparatus of claim 1, wherein the first conveyor comprises:

a plurality of grippers adapted to suspend the flat articles during conveying.

5. The apparatus of claim 1, wherein the first conveyor is adapted to transfer the flat articles to the containers as a result of gravitational force.

6. The apparatus of claim 1, wherein the containers comprise pockets.

7. The apparatus of claim 1, further comprising:

guide elements, wherein each container is mounted to a corresponding guide element to be displaced along the guide element in the direction substantially transverse to the direction of the product flow to form the partial flows.

8. The apparatus of claim 7, wherein the containers are adapted to be displaced in alternating opposite directions to form the partial flows.

9. The apparatus of claim 1, wherein each container comprises:

a hinge, extending along a lower edge of each of the containers, each of the hinges having a hinge axis oriented substantially transverse to the direction of the product flow, wherein each container is adapted to swivel around a respective hinge.

10. The apparatus of claim 1, further comprising:

an additional conveyor located downstream of the separator in the direction of the product flow, wherein the additional conveyor conveys the partial flows.

11. The apparatus of claim 10, wherein the first conveyor conveys the flat articles at a first speed, and the separator conveys the flat articles at a second speed that is less than or equal to the first speed.

12. The apparatus of claim 10, wherein the additional conveyor comprises a belt conveyor.

13. The apparatus of claim 1, further comprising:

an endless conveyor having an upper, substantially horizontal conveying section adapted to reposition the containers from an upright or substantially perpendicular position with respect to a horizontal line to a substantially horizontal position.

14. The apparatus of claim 13, wherein the endless conveyor includes a link chain.

15. The apparatus of claim 1, wherein the separator comprises a pocket wheel.

16. The apparatus of claim 15, wherein the pocket wheel comprises:

a drum adapted to rotate around a substantially horizontal axis the plurality of containers being positioned around a circumference of the drum and pointing radially outward with respect to the drum.

17. The apparatus of claim 16, wherein the pocket wheel further comprises:

a plurality of guide elements located around the circumference of the drum, wherein the guide elements are adapted to displace the containers in a direction substantially parallel to the horizontal axis.

18. The apparatus of claim 1, wherein the flat articles include print products.

* * * * *